(12) United States Patent  
Anderson (10) Patent No.: US 7,523,433 B1
(45) Date of Patent: Apr. 21, 2009

(54) SYSTEM AND METHOD FOR AUTOMATED ANALYSIS AND HIERARCHICAL GRAPHICAL PRESENTATION OF APPLICATION RESULTS

(75) Inventor: Hans-Werner Anderson, Filderstadt (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/059,703

(22) Filed: Mar. 31, 2008

(51) Int. Cl.
*G06F 17/50* (2006.01)
*G06F 7/00* (2006.01)
*G06F 17/30* (2006.01)
*G06F 17/40* (2006.01)
*G06F 12/00* (2006.01)
*G06F 9/44* (2006.01)
*G06F 9/45* (2006.01)

(52) U.S. Cl. .................. 716/11; 716/4; 707/3; 707/4; 707/102; 707/104.1; 707/202; 707/204; 717/105; 717/109; 717/113; 717/114; 717/120; 717/134; 717/135; 717/136

(58) Field of Classification Search .............. 716/11, 716/4; 707/3, 4, 102, 104.1, 202, 204; 703/16, 703/17; 717/105, 109, 113, 114, 120, 134, 717/135, 136
See application file for complete search history.

(56) References Cited

U.S. PATENT DOCUMENTS

| 6,385,609 | B1 * | 5/2002 | Barshefsky et al. ............ 707/6 |
| 6,532,427 | B1 | 3/2003 | Joshi et al. |
| 6,611,498 | B1 * | 8/2003 | Baker et al. ................. 370/252 |
| 6,785,718 | B2 * | 8/2004 | Hancock et al. ............. 709/219 |
| 6,938,229 | B2 | 8/2005 | Bowers et al. |
| 6,951,011 | B1 * | 9/2005 | Sexton ........................ 717/124 |
| 6,956,845 | B2 * | 10/2005 | Baker et al. ................. 370/352 |
| 7,069,271 | B1 * | 6/2006 | Fadel et al. ................. 707/102 |
| 7,069,278 | B2 * | 6/2006 | Telkowski et al. ........... 707/204 |
| 7,149,989 | B2 * | 12/2006 | Lakshmanan et al. .......... 716/5 |
| 7,197,558 | B1 * | 3/2007 | Harper et al. ............... 709/224 |
| 7,222,133 | B1 * | 5/2007 | Raipurkar et al. ........... 707/200 |
| 7,228,565 | B2 * | 6/2007 | Wolff et al. .................... 726/24 |
| 7,302,442 | B2 * | 11/2007 | Sampson et al. ............ 707/101 |
| 7,324,972 | B1 * | 1/2008 | Oliver et al. .................. 705/40 |
| 2002/0010394 | A1 * | 1/2002 | Zavislan ..................... 600/407 |
| 2002/0054587 | A1 * | 5/2002 | Baker et al. ................. 370/352 |
| 2002/0069105 | A1 * | 6/2002 | Do Rosario Botelho et al. ........................... 705/14 |
| 2002/0174358 | A1 * | 11/2002 | Wolff et al. ................. 713/200 |

(Continued)

*Primary Examiner*—Phallaka Kik
(74) *Attorney, Agent, or Firm*—King & Spalding LLP (57) ABSTRACT

A method for analyzing and presenting application results, said method comprising the steps of creating at least one log file representing a result file of an application; tagging the at least one log file with at least one file tag representing a location of the result file of the application; tagging the at least one log file with at least one return code tag; tagging the at least one log file with at least one application configuration tag representing a graphical representation of the result file of the application; parsing the at least one log file tag; parsing the at least one return code tag; parsing the at least one application configuration tag; generating a summary report file from the at least one log file by using the parsed at least one file tag, the at least one return code tag, and the at least one application configuration tag; translating the summary report file into the graphical representation wherein the graphical representation comprises hyperlinks for navigation between the at least one log file; and presenting the graphical representation.

1 Claim, 3 Drawing Sheets

U.S. PATENT DOCUMENTS

| | | | |
|---|---|---|---|
| 2003/0128991 A1* | 7/2003 | Carling et al. | 399/8 |
| 2005/0065987 A1* | 3/2005 | Telkowski et al. | 707/204 |
| 2005/0216421 A1* | 9/2005 | Barry et al. | 705/64 |
| 2005/0273453 A1* | 12/2005 | Holloran | 707/1 |
| 2006/0031442 A1* | 2/2006 | Ashley et al. | 709/223 |
| 2006/0064656 A1* | 3/2006 | Lakshmanan et al. | 716/5 |
| 2006/0075001 A1* | 4/2006 | Canning et al. | 707/203 |
| 2006/0143244 A1 | 6/2006 | Chia | |
| 2006/0168569 A1* | 7/2006 | Smith et al. | 717/124 |
| 2006/0184498 A1* | 8/2006 | Meyer et al. | 707/1 |
| 2006/0200508 A1* | 9/2006 | Telkowski et al. | 707/204 |
| 2006/0218135 A1* | 9/2006 | Bisson et al. | 707/4 |
| 2006/0277161 A1* | 12/2006 | Sampson et al. | 707/3 |
| 2007/0239799 A1 | 10/2007 | Modi | |
| 2007/0282951 A1* | 12/2007 | Selimis et al. | 709/205 |
| 2007/0288789 A1* | 12/2007 | Harper et al. | 714/1 |

* cited by examiner

SYSTEM AND METHOD FOR AUTOMATED ANALYSIS AND HIERARCHICAL GRAPHICAL PRESENTATION OF APPLICATION RESULTS

BACKGROUND OF THE INVENTION

1. Field of the Invention

This invention relates to a method for automated analysis and hierarchical graphical presentation of application results.

2. Description of Background

Chip design, such as very-large scale integration ("VLSI") chip design, is highly market driven. This forces the development cycles to be very short and high productivity in the development process is necessary. A chip consists of a number of design parts. The number of design parts varies, but for large processor chips the number of design parts is up to several hundreds. Usually there is a least one hierarchy level, i.e., several design parts add up to a so called 'unit' and several units add up to the chip. During the development process, all design parts of a chip have to pass a number of checking tools or applications. Similarly, all units need to pass a different set of checking tools or applications. The required tool or application set may be specified by a design guide, which has been chosen to manufacture the chip. In some cases, the number of tools or applications that need to be run can range up to several dozen.

Each of the tools or applications that are run on each level of the development process may create a report summary or log file. Currently, there exists no report summary or log file generation dependency between the different tools or applications. Many times the design guide specifies the data formats of the design parts throughout the design process. Therefore, chip designers and project management must keep track of the results of each of the checking tools or applications. Because a chip may only be sent to manufacturing if it passes all of the required checking tools or applications, the number of tools or applications necessary for a chip (from beginning to end) may be the number of design parts times the number of checking tools or applications required.

The traditional report generation is based on log files which are plain text files. The syntax and wording in the log files may differ because, for example, different applications are written by different programmers who may be spread in different departments and use different programming languages or applications may be used in several chip design projects concurrently with different environment setups.

SUMMARY OF THE INVENTION

A method for analyzing and presenting application results, said method comprising the steps of creating at least one log file representing a result file of an application; tagging the at least one log file with at least one file tag representing a location of the result file of the application; tagging the at least one log file with at least one return code tag; tagging the at least one log file with at least one application configuration tag representing a graphical representation of the result file of the application; parsing the at least one log file tag; parsing the at least one return code tag; parsing the at least one application configuration tag; generating a summary report file from the at least one log file by using the parsed at least one file tag, the at least one return code tag, and the at least one application configuration tag; translating the summary report file into the graphical representation wherein the graphical representation comprises hyperlinks for navigation between the at least one log file; and presenting the graphical representation.

It is an object of the present invention to create an analysis and hierarchical graphical presentation of reports for checking tools or applications.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 1A illustrates an exemplary environment for managing the processes in accordance with the invention.

FIG. 1B illustrates an exemplary flow chart in accordance with one exemplary traditional generation of application results.

FIG. 2 illustrates an exemplary flow chart in accordance with one exemplary embodiment of the present invention.

The detailed description explains the preferred embodiments of the invention, together with advantages and features, by way of example with reference to the drawings.

DETAILED DESCRIPTION OF THE INVENTION

Figure 1A:
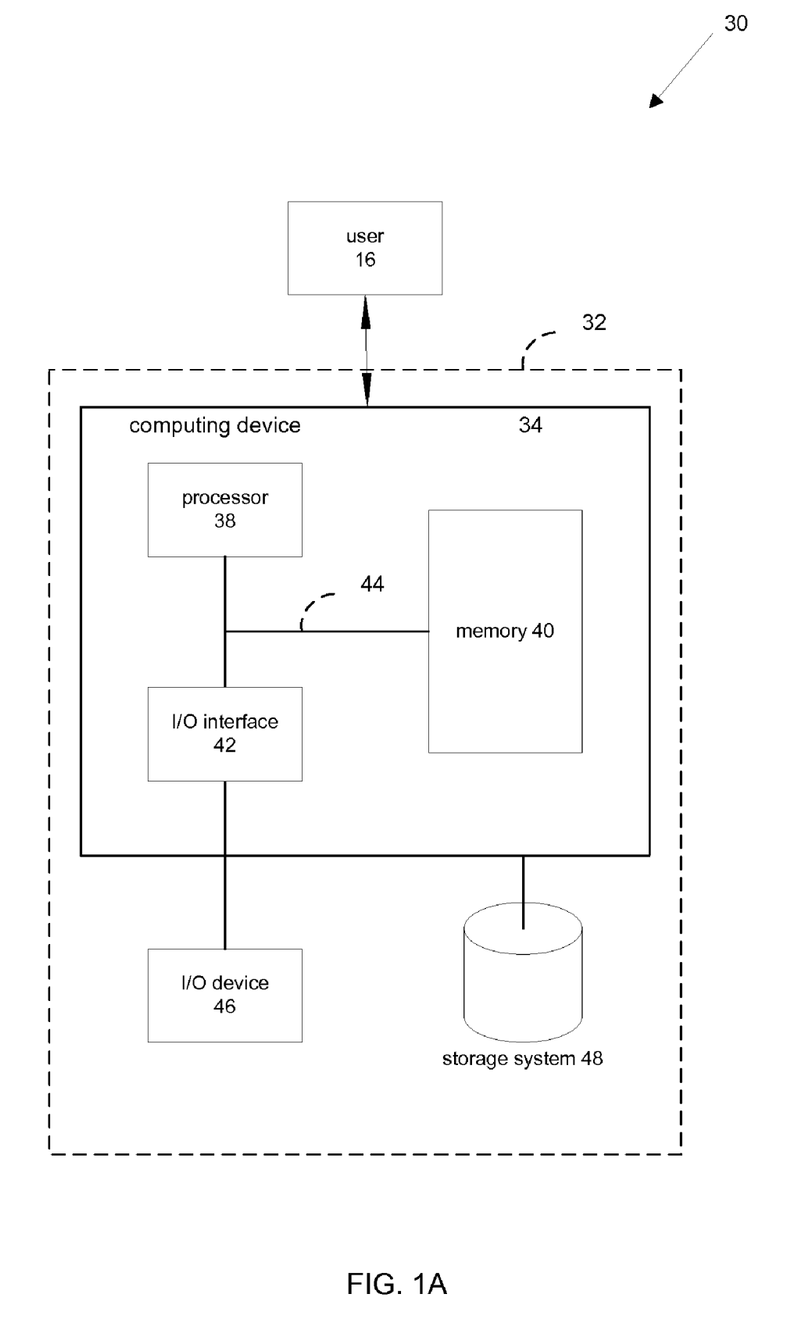

With reference to the accompanying drawings, FIG. 1A shows an illustrative environment 30 for managing the processes in accordance with the invention. To this extent, the environment 30 includes a computer infrastructure 32 that can perform the processes described herein. In particular, the computer infrastructure 32 is shown including a computing device 34 operable to perform the processes described herein. The computing device 34 is shown including a processor 38, a memory 40, an input/output (I/O) interface 42, and a bus 44. Further, the computing device 34 is shown in communication with an external I/O device/resource 46 and a storage system 48. As is known in the art, in general, the processor 38 executes computer program code, which is stored in memory 40 and/or storage system 48. While executing computer program code, the processor 38 can read and/or write data, such as the range boundary 50, to/from memory 40, storage system 48, and/or I/O interface 42. The bus 44 provides a communications link between each of the components in the computing device 34. The I/O device 46 can comprise any device that enables an individual to interact with the computing device 34 or any device that enables the computing device 34 to communicate with one or more other computing devices using any type of communications link.

The computing device 34 can comprise any general purpose computing article of manufacture capable of executing computer program code installed thereon (e.g., a personal computer, server, handheld device, etc.). However, it is understood that the computing device 34 is only representative of various possible equivalent computing devices that may perform the processes described herein. Similarly, the computer infrastructure 32 is only illustrative of various types of computer infrastructures for implementing the invention. For example, in one embodiment, the computer infrastructure 32 comprises two or more computing devices (e.g., a server cluster) that communicate over any type of communications link, such as a network, a shared memory, or the like, to perform the process described herein.

Figure 1B:
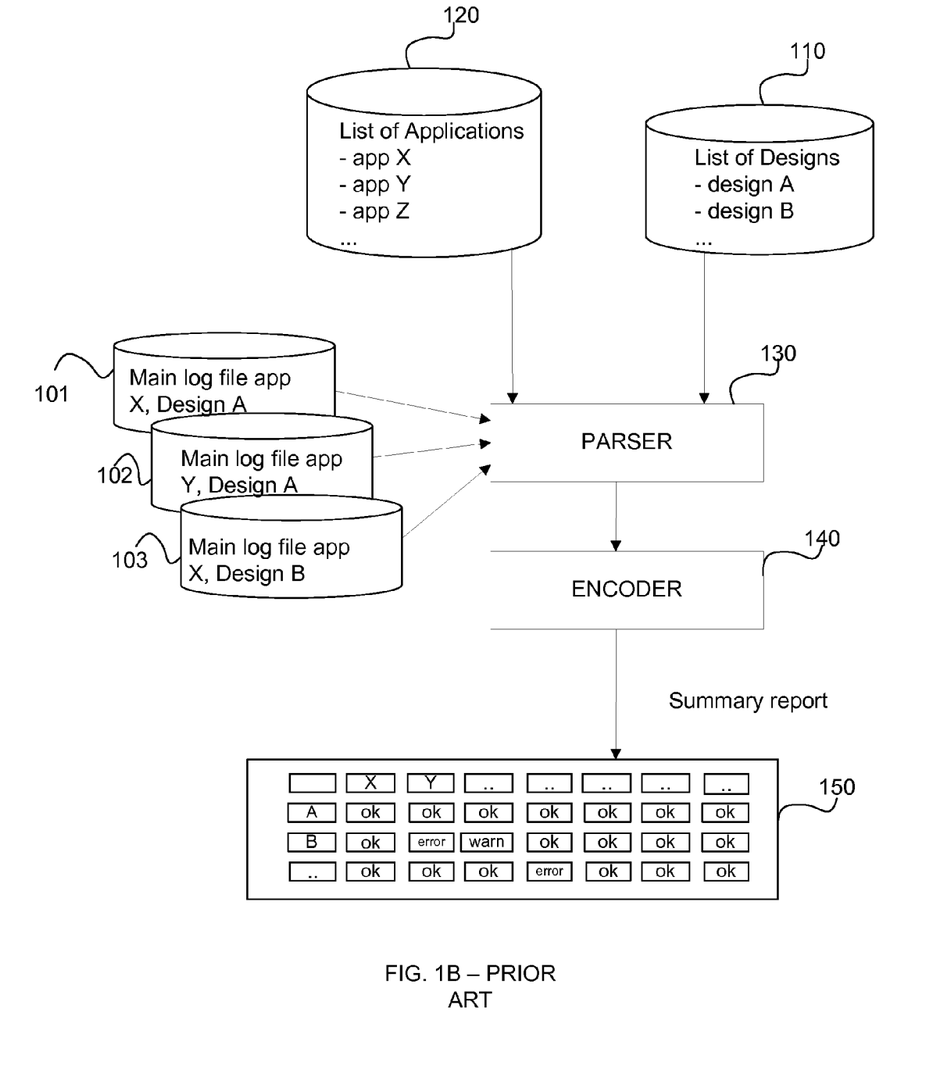

FIG. 1B illustrates an exemplary flow chart in accordance with the current approach to report generation. Databases 101-103 depict the information required for each chip design part. For example, database 101 contains information for a design part to be manufactured in accordance with design A, from design database 110. The checking tool or application used for the design part is application X, from application database 120. A main log file is created using application X for design A. Similarly, database 102 contains information for a design part to be manufactured in accordance with design A. However, the checking tool or application used for this design part is application Y. A main log file is created using application Y for design A. Database 103 contains information for a design part to be manufactured in accordance with design B. The checking tool or application for this design part is application X. A main log file is created using application X for design B.

Once the main log files are generated for each of the design parts represented by databases 101-103 as described above, they are parsed by parser 130 and a summary report 150 is generated by encoder 140, is generated. Summary report 130 contains the error or warning messages of the applications extracted from their 'Main log files.'

As a further example, log files for a set of different applications is illustrated. For example, a log file for, e.g., a layout versus schematic ("LVS") check may be illustrated as:

```
                    RETURN CODE SUMMARY

Project:              new
Technology:
Library:              new_webbld
LibPath:
Cellview:             A layout
Prime Cell:           A
Design Type:          CUSTOMRLM
Run date:             Wed Jan 9 11:07:59 CET 2008

PROGRAM               RC        LOGFILE

CDSTOOASIS            0         path/A.oasisLog
SNLNETLIST            0         path/A.snlnetlistLog
X_LVS                 0         path/A.lvs.niagLog
X_POST_LVS            0         path/A.lvs.niagLog
```

A log file for, e.g., a Boolean equivalence check may be illustrated as:

```
+ ------------------------------------------------------ +
|                      App Y 11.1.1                      |
|           (C) Copyright IBM Corporation 1993-2008      |
+ ------------------------------------------------------ +
            Customized version:  Nutshell
            Compiled on:         Nov 18 2006 at 02:08:39
            Machine:             hdc179.boeblingen.de.ibm.com
            Process Id:          394730
Memory before reading all designs: 2641024
Memory after reading all designs: 2134048
Writing module file : '.>/A.ver.gz'.
========================================================
Summary of Results
========================================================
Verification summary of       : 'A/PVHDL1' against 'A/DEVICE2'
as of                         : Wed Jan 9 11:15:55 2008
Golden Model                  : A
Golden Version                : PVHDL1
Assertion File                :
  Number of Nets              : 1404
  Number of Switches          : 0
  Number of Gates             : 1080
                       Not    : 179
                       And    : 527
                       Or     : 374
Compare Model                 : A
Compare Version               : DEVICE2
Assertion File                :
```

```
-continued

Number of Nets              : 896
  Number of Switches          : 1524
  Number of Gates             : 0

Summary of Comparisons, Tests, and Consistency Checks performed:

Comparisons    Tests    Consistency Checks
Open                  0           0              0
Skipped               0           0              0
Successful          312           0           3000
Failed
  debugged            0           0              0
  no debug            0           0              0

Total               312           0           3000

Total memory used             : 22776 KBytes
Total CPU seconds             : 0.22 s
App Y Return Code             : V-OK
```

And a log file for, e.g., a resistance and capacitance ("RC") extraction run, may be illustrated as:

```
Headers updated Jun. 27, 2005
/usr/bin/mkdir <path>/App_Z.A.5/bin
/usr/bin/find ...
Copy Scripts locally RC = 0
#----------------------#
$CTEPROJNAME: new
$CTECHIPID: id
#----------------------#
        ... lots of other plain text ...
#----------------------#
App_Z_logdata called
This job is running on host hdc182.boeblingen.de.ibm.com on Wed
Jan 9 11:24:13 CET 2008.
Arguments for App_Z.alli.run.no_shadexp.vim
        ... lots of other plain text ...
Executing Extraction Step
        ... lots of other plain text ...
real     6m3.07s
user     5m29.58s
sys      0m29.88s
Checking EXTRACT.msgs for successful completion.
<path>/App_Z.A.5/A.EXTRACT.msgs
App_Z success RC equals   0
miniPP turned off by customer - not run
cap3D not called
PP not called
App_Z RC equals   0
Screening netlist for NONAME and _SC1 in device section ...
        ... lots of other plain text ...
real     1m33.78s
user     1m30.32s
sys      0m4.38s
Astap RC equals   0
SED ASTAP RC equals   0
ASTAP copy pre_sed RC equals
App_Z_status called
remove intermediate files
```

The difficulties to parse and find specific information to encode a checking tool's or application's report may be seen through the different syntax of each of the three log files illustrated above. For instance, the return code of each of the log files differs in all three applications. The return code in the log file for the LVS check is "X_LVS 0." The return code in the log file for the Boolean equivalence check is "App Y Return Code: V-OK." The return code for the log file for the RC extraction run is "App_Z RC equals 0." Parser 130 and encoder 140 will not be able to globally interpret these different return codes, and, therefore, summary report 150 may display error or fail messages.

Similarly, the syntax for the information representing the computer system the application runs on differs in each of the log files (e.g., "no information available," "Machine: hdc179.boeblingen.de.ibm.com," and "This job is running on host hdc182.boeblingen.de.ibm.com"). As a further example, the information about the start time of the application differs (e.g., "Run date: Wed Jan 9 11:07:59 CET 2008," "as of: Wed Jan 9 11:15:55 2008," and "on Wed Jan 9 11:24:13 CET 2008").

The above examples demonstrate the difficulties with plain text parsing, such as changing structure and syntax of application log file(s) and adding new applications is not possible without programming effort in the parser. Typically, there is no information available about the interpretation/presentation of the final return code. As it is difficult to determine directory paths in a plain text file information about additional log files and navigation between those is not available.

Figure 2:
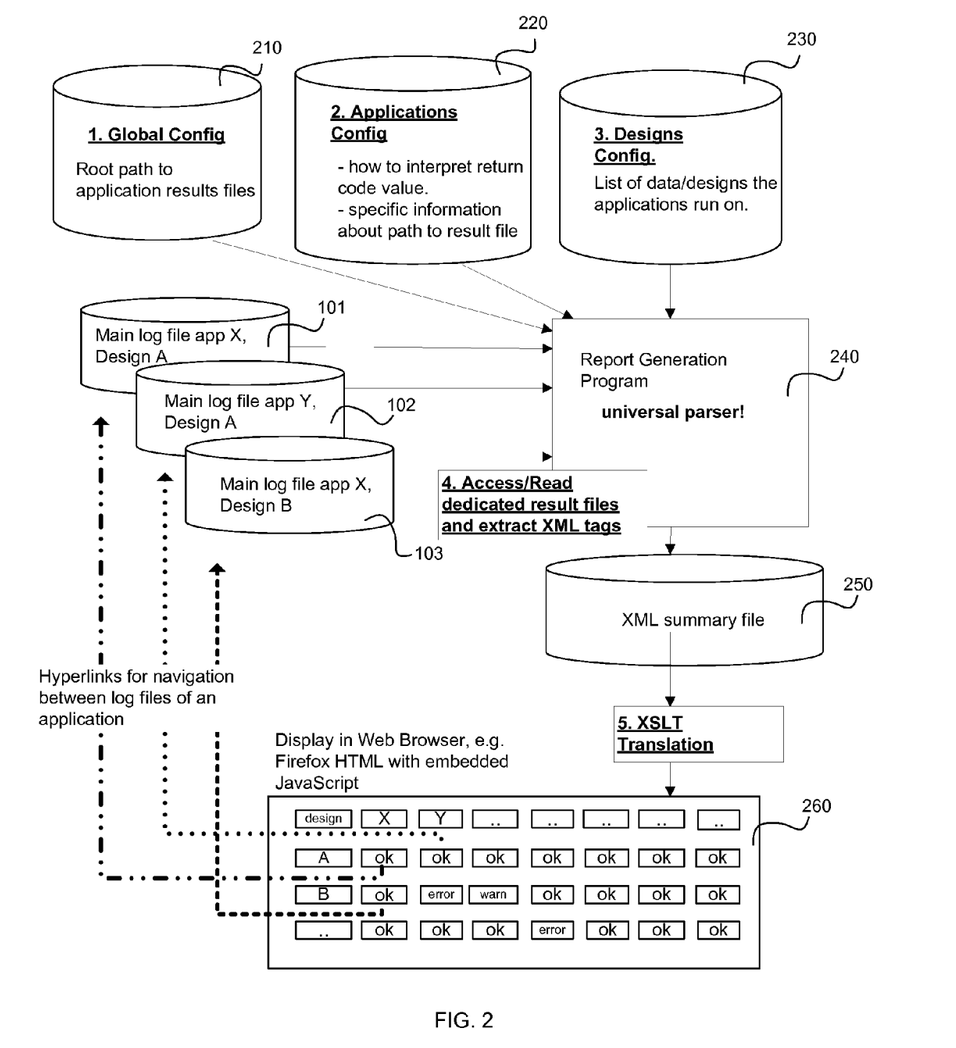

The preferred embodiment of this invention approaches at least the above identified problems with the prior art with a universal parser and encoder to produce summary reports reliably and without parser fail. And with a universal parser, the report generation can 'grow,' i.e., new applications can be added without parser changes or adaptions. FIG. 2 illustrates an exemplary schematic in accordance with one exemplary embodiment of the present invention.

Databases 101-103 depict the information required for each chip design part as described in FIG. 1B. The log files of the databases 101-103 are processed with information from the Global Configuration database 210, Application Configuration database 220, and Designs Configuration database 230. Global Configuration database 210 contains information related to the roots of the paths to the application log files. Application Configuration database 220 contains information about how to interpret return code values. It may further contain specific information about path to log files. Designs Configuration database 230 contains information relating to the data/designs the applications run on. Report Generation Program 240 accesses and reads the dedicated log files and extracts tags that, according to a preferred embodiment, is in Extensible Markup Language ("XML"). Report Generation Program 240 also generates results data structures stored in XML Summary File database 250. The information in XML Summary File database 250 is then translated via, e.g., Extensible Stylesheet Language Transformations ("XSLT") and Visual Interface 260 is generated in, e.g., Javascript/HTML. Visual interface 260 is a graphical representation of application results that are formatted in a hierarchical fashion. Visual interface 260 may also contain hyperlinks for navigation to the log files of databases 101-103.

As discussed above, Report Generation Program 240 accesses and reads the dedicated log files and extracts XML tags. Each of the XML tags may be coded by the owner of the application. For instance, the following XML tags, which are proprietary to IBM, include:

| Mandatory tags | |
| --- | --- |
| appresult | start/end tag for xml parser |
| appname | Name of application |
| appresultfile | will be translated to html link to the main result file |
| returncode | value will be shown in html table. Value is also used to color code the table cell |
| text | encloses any textual information. The enclosed text is not part of the summary file |

| Optional tags | |
| --- | --- |
| starttime | start time of application |
| endtime | end time of application |
| machine | Machine information, where application ran |
| jobID | if run with batch submission system, the job id information |
| design | name of design/data the application processes |
| stepname | name of a processing step |
| steprc | return code of a processing step |
| resultfile | will be translated to html link to step (i.e. sub) log files |
| jobstatus | information about processing in batch system, e.g. Completed, Cancelled, Failed |
| jobinfo | an further textual information about application |

The following shows an exemplary log file containing the XML tags described above:

```
<?xml version="1.0" ?>
<appresult>
<appname>application_name</appname>
<starttime>10:07 6/13/07</starttime>
<machine>machine_name</machine>
<jobID>job_number_in_machine_pool</jobID>
<design>design_name</design>
<appresultfile>absolute_link_to_this(main)_log_file</appresultfile>
<text>
...
... any text ...
...
</text>
<stepname>s1</stepname>
<steprc>0</steprc>
<resultfile>absolute_link_to_detailed_log_file_of_this_step</resultfile>
<text>
...
... any text ...
...
</text>
```

*-continued*

```
<stepname>s2</stepname>
<steprc>1</steprc>
<resultfile>absolute_link_to_detailed_log_file_of_this_step</resultfile>
<text>
...
... any text ...
...
</text>
<jobstatus>Completed</jobstatus>
<returncode>0</returncode>
<jobinfo>Any textual information that explains the final return code or other user hints</jobinfo>
<endtime>10:16 6/13/07</endtime>
</appresult>
```

For graphical representation of the return codes (from the log files) in a table some more information may be needed, such as the mapping of a return code (or a range) to specific text and color. Tags may be stored in Application Configuration database 220 providing the relevant information. For example, the following XML tags may be included in Application Configuration database 220:

| Mandatory tags | |
|---|---|
| applicationlist | start/end tag for list of applications |
| application | start/end tag for application |
| application_name | name of application |
| rcclasses | start/end tag for return code values |
| ok (green), warning (yellow), error (red) | text and color of table cell for returncode |
| attribute lvalue | value that defines ok, warning or error |
| attribute rvalue (optional) | defines a range for ok, warning or error |
| directvalue | specifies, if text ok, warning or error should be shown in the result summary (value = "false"). With value = "true" the returncode value will be shown as number in the result summary |

The following exemplifies the XML tags that may be stored in Application Configuration database 220:

```
<?xml version="1.0" ?>
<applicationlist>
 <application>
  <appname>application_name</appname>
  <rcclasses>
   <ok lvalue="0"/>
   <warning lvalue="1" rvalue="3"/>
   <error lvalue="4" rvalue="99999"/>
   <directvalue value="false" />
  </rcclasses>
 </application>
 <application>
  ...
 </application>
 ...
```

A log file for an application with an exemplary embodiment of the present invention may be:

```
<?xml version="1.0" ?>
<appresult>
 <appname>X</appname>
```

*-continued*

```
<starttime>11:07 01/09/2008</starttime>
<endtime>11:16 01/09/2008</endtime>
<design>A</design>
<appresultfile>path/application_x.log</appresultfile>
<text>
```

| RETURN CODE SUMMARY | |
|---|---|
| Project: | new |
| Technology: | |
| Library: | new_webbld |
| LibPath: | |
| Cellview: | A layout |
| Prime Cell: | A |
| Design Type: | CUSTOMRLM |
| Run date: | Wed Jan 9 11:07:59 CET 2008 |

| PROGRAM | RC | LOGFILE |
|---|---|---|
| CDSTOOASIS | 0 | path/A.oasisLog |
| SNLNETLIST | 0 | path/A.snlnetlistLog |
| X_LVS | 0 | path/A.lvs.niagLog |
| X_POST_LVS | 0 | path/A.lvs.niagLog |

```
</text>
<stepname>CDSTOOASIS</stepname>
<steprc>0</steprc>
<resultfile>path/A.oasisLog </resultfile>
<stepname>SNLNETLIST</stepname>
<steprc>0</steprc>
<resultfile>path/A_snlnetlistLog</resultfile>
    ... other steprc accordingly ...
<returncode>0</returncode>
</appresult>
```

In the above example, the log file for the exemplary application is enriched with XML tags. As shown, the XML tags may be mixed with the text or collected at the beginning or end of the log file. Similarly, another embodiment of a log file for an exemplary application

```
<?xml version="1.0" ?>
<appresult>
<appname>Y</appname>
<starttime>11:15 01/09/2008</starttime>
<endtime>11:19 01/09/2008</endtime>
<machine>hdc179.boeblingen.de.ibm.com</machine>
<design>A</design>
<appresultfile>path/application_y.log</appresultfile>
<returncode>0</returncode>
<text>
+ -------------------------------------------------- +
|            App Y 11.1.1                            |
|   (C) Copyright IBM Corporation 1993-2008          |
+ -------------------------------------------------- +
```

-continued

```
Customized version:  Nutshell
Compiled on:         Nov 18 2006 at 02:08:39
Machine:             hdc179.boeblingen.de.ibm.com
Process Id:          394730
```

As discussed above, Report Generation Program 240 generates results data structures stored in XML Summary File database 250. The results, or summary files, stored in XML Summary File database 250 may be a collection of all of the log files of the different applications. An exemplary summary file may be:

```xml
<?xml version="1.0" encoding="UTF-8"?>
<resultcollection>
  <requiredapps>
    <app>X</app>
    <app>Y</app>
    <app>Z</app>
  </requiredapps>
  
    <design>A</design>
    <app name="X">
      <starttime>11:07 01/09/2008</starttime>
      <machine>machine_name</machine>
      <jobID>job_number_in_machine_pool</jobID>
      <appresultfile>absolute_link_to_main_log_file</appresultfile>
      <stepname>CDSTOOASIS</stepname>
      <steprc>0</steprc>
      <resultfile>absolute_link_to_detailed_log_file_of_this_step</resultfile>
      <stepname>SNLNETLIST</stepname>
      <steprc>0</steprc>
      <resultfile>absolute_link_to_detailed_log_file_of_this_step</resultfile>
      ...
      <jobstatus>Completed</jobstatus>
      <returncode directvalue="false" type="ok">0</returncode>
      <jobinfo>...</jobinfo>
      <endtime>11:16 01/09/2008</endtime>
    </app>
    <app name="Y">
      <starttime>11:15 01/09/2008</starttime>
      ...
      <returncode directvalue="false" type = "ok">0</returncode>
      ...
    </app>
    ...
  
  
    <design>B</design>
```

-continued

```
Memory before reading all designs: 2641024
Memory after reading all designs: 2134048
Writing module file : './A.ver.gz'.
=====================================================
Summary of Results
=====================================================
Verification summary of        : 'A/PVHDL1' against 'A/DEVICE2'
as of                          : Wed Jan 9 11:15:55 2008
Golden Model                   : A
Golden Version                 : PVHDL1
Assertion File                 :
  Number of Nets               : 1404
  Number of Switches           : 0
  Number of Gates              : 1080
                         Not   : 179
                         And   : 527
                         Or    : 374
Compare Model                  : A
Compare Version                : DEVICE2
     ... other text as shown in FIG. 3   ! ...
Total memory used              : 22776 KBytes
Total CPU seconds              : 0.22 s
App Y Return Code              : V-OK
</text>
</appresult>
```

Some exemplary proprietary XML tags defined in the summary file above are:

Start tag in summary file is <resultcollection>

A list of all applications follows, enclosed in <requiredapps>, </requiredapps>. The applications are listed in <app>, </app> tags.

List of results per design for all applications, enclosed by <result>, </result> tag <design> tag specifies actual design After <design> list of applications enclosed with <app>, </app> tag follows.

The <app> tag encloses all information from application 'main' log file

The information in XML Summary File database 250 is then translated via, e.g., XSLT. XSLT describes rules for transforming a source tree into a result tree. XSLT may be used to convert user defined XML tags (such as the exemplary tags described above) into (X)HTML. By using XML and XSLT, the results data is stored separate from its representation. Therefore, the graphical presentation of the result data may be changed by using a different XSLT description and may be adapted easily to project needs. An example of XSLT translation code may be:

```
<table>
<tr>
```

```
    <td>design</td>
    <xsl:apply-templates
select="resultcollection/requiredapps/app"> (1)
    </tr>
. . .
<xls:apply_templates . . . template that generates all table
    cell data . . . >
</table>
```

This sample code template definition would result in the generation of a header line of all applications:

```
    <xsl:template match="requiredapps/app">
    <td class="app"><xsl:value-of select="."/></td>
    </xsl:template>
```

The graphical representation of may appear as:

| design | X | Y | .. | .. | .. | .. | .. |
|--------|---|---|----|----|----|----|----|

Each of the table cells is color coded according to returncode value and its interpretation from the XML tag in Application Configuration database 220, i.e., the 'type' attribute in the 'returncode' tag. The 'directvalue' attribute will represent the text ok., warn or error. The JavaScript is embedded, which enables each table cell to be hyperlinked to the detailed information provided by the application XML tags in the XML summary file. This is done by transforming XML <appresultfile> and <resultfile> values are transformed to hyperlinks. This formatting allows the hierarchy of application result files to be searched through.

Finally, a Visual Interface 260 is generated. An exemplary meta code of the implementation of the Visual Interface 260 of the summary files may be:

```
<html>
<head>
<script type="text/javascript">
```

A JavaScript function may also be included to allow a new Internet browser window to be opened when the hyperlinked cell is selected. The appearance of this new browser window may be defined in an HTML template, e.g., template.html. This template may include additional parameters defined by 'param' below:

```
    function shortSummary(param) {
        window.name = "pop-up";
        var win = window.open("PATH/template.html?"+
            param,"", . . . window options . . . );
    }
    </script>
    </head>
    <body>
. . .
. . . XSLT template definitions and usage to extract infor-
    mation . . . (like described above in (1))
. . .
```

With XSLT templates all application information may be extracted according the defined application XML tags in the summary file. All the extracted information, like machine, starttime, may be concatenated and stored in variable 'jspparam'. There may also be an anchor <a> defined, which calls the javascript function 'shortSummary' with the parameter 'jspparam'. The text, like ok, error or warn, which appears in the table cell, may be defined by variable 'displayedtext:

```
    <xsl:variable name="jsparam">
. . .
    <xsl.value-of select="machine"/>~
    <xsl:value-of select="jobID"/>~
    <xsl:value-of select="starttime"/>~
    <xsl:value-of select="endtime"/>~
    <xsl:value-of select="$varreturncode"/>~
    <xsl:value-of select="appresultfile"/>~
    <xsl:for-each select="stepname"><xsl:value-of
        select="."/>;</xsl:for-each>~
    <xsl:for-each select="steprc"><xsl:value-of select="."/>;
        </xsl:for-each>~
    <xsl:for-each select="resultfile"><xsl:value-of select="."/
        >;</xsl:for-each>~
. . .
    </xsl:variable>
    <a href="" title="{$jobinfo}"
    onclick="javascript:shortSummary('{$jsparam}')">
    <xsl:value-of select="$displayedtext"/>
    </a>
. . .
. . .
```

The exemplary file template.html, which defines the appearance of a new browser as described above, may include the following HTML text:

```
<html>
<head></head>
<body>
<pre>
<script language="JavaScript">
. . . split all provided information with 'param' and save it
in variables . . . .
    var hrefline = hreflinex.split("?");
    var param = hrefline[1].split("~");
. . .
    var machine = param[3];
    var jobid = param[4];
    var starttime = param[5];
    var endtime = param[6];
    var returncode = param[7];
    var appresultfile = param[8];
    var stepname = param[9].split(";");
    var steprc = param[10].split(";");
    var resultfile = param[11].split(";");
. . .
. . . then write the HTML document . . .
    document.writeln("<table>");
. . .
    document.writeln("<tr><td>Job   ID:</td><td>"+jobid+
"</td></tr>");
    document.writeln("<tr><td>Start   time:</td><td>"+start-
time+"</td></tr>");
    document.writeln("<tr><td>End   time:</td><td>"+end-
time+"</td></tr>");
    document.writeln("</table>");
. . .
    document.writeln("<table>");

for(i=0; i < stepname.length-1; i++) {
    document.writeln("<tr>");
    document.writeln("<td>"+stepname+"</td><td>"+steprc+"</td>");
    document.writeln("<td><a href='"+resultfile[i]+"'>"+
    resultfile[i]+"</a></td>");
    document.writeln("</tr>");
}
document.writeln("<td>returncode "+returncode+"</td>");
```

```
...
    document.writeln("</table>");
...
</script>
</pre>
</body>
</html>
```

The HTML result after the XSLT translation of the XML summary file may be displayed in a Web Browser and appear as:

HTML Table generated by XSLT translation.

| design | X | Y | | | | | |
|---|---|---|---|---|---|---|---|
| A | ok | ok | ok | ok | ok | ok | ok |
| B | ok | error | warn | ok | ok | ok | ok |
| ... | ok | ok | ok | error | ok | ok | ok |

Clicking on the 'ok' field may cause a new Browser window, such as the one illustrated below, to open. The embedded JavaScript code displays all other information provided by the XML tags in the XML summary file for application X. This pop-up window shows the results for an exemplary application.

| | | |
|---|---|---|
| Design | A | |
| Starttime | 11:07 01/09/2008 | |
| Endtime | 11:16 01/09/2008 | |
| Resultfile | path/application_x.log | |
| CDSTOOASIS | 0 | path/A.oasisLog |
| SNLNETLIST | 0 | path/A.snlnetlistLog |
| X_LVS | 0 | path/A.lvs.niagLog |
| X_POST_LVS | 0 | path/A.lvs.niagLog |
| returncode | 0 | |

Adding the described XML tags in application result files enables automated result file processing with a universal parser. In addition, new applications can be added easily, i.e., only a new entry in Application Config file is required. No programming efforts are required for adapting a parser to new applications. This will increase productivity.

By using XSLT transformation the look-and-feel of the output HTML can be varied. In addition, there is no longer a dependency on varying log file syntax and structure. Color coding may be added, corresponding to external application result specifications, which will create a more user friendly interface. In addition, navigation through the result files may be made in a hierarchical manner.

XML summary files may be used as input to other subsequent applications and later read with standard XML parsers as many programming languages use XML parsers or similar tools.

It will be well understood by those skilled in the art that the XML report generation method described above is application in many different environments, outside of chip design. It is applicable to any environment where a set of parts must pass a set of tests or other checking application. It can further be implemented in Logic Verification processes, where each of the parts have different logic behavior. Such a process may result in a summary table such as the one below, where NA means the test is not applicable:

| Logic | Test 1 | Test 2 | Test 3 | Test 4 | Test 5 | Test 6 | Test 7 |
|---|---|---|---|---|---|---|---|
| A | NA | NA | NA | ok | ok | NA | NA |
| B | ok | error | warn | NA | NA | NA | NA |
| ... | NA | NA | NA | error | ok | NA | NA |

The diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for analyzing and presenting application results, said method comprising the steps of:
   creating at least one log file representing a result file of an application;
   tagging the at least one log file with at least one file tag representing a location of the result file of the application;
   tagging the at least one log file with at least one return code tag;
   tagging the at least one log file with at least one application configuration tag representing a graphical representation of the result file of the application;
   parsing the at least one log file tag;
   parsing the at least one return code tag;
   parsing the at least one application configuration tag;
   generating a summary report file from the at least one log file by using the parsed at least one file tag, the at least one return code tag, and the at least one application configuration tag;
   translating the summary report file into the graphical representation wherein the graphical representation comprises hyperlinks for navigation between the at least one log file; and
   presenting the graphical representation.

* * * * *